United States Patent [19]
Saito et al.

[11] 3,848,117

[45] Nov. 12, 1974

[54] ELECTRONIC ANALOG OPERATIONAL CIRCUIT

[75] Inventors: Tadayoshi Saito, Hitachi; Kiyoshi Miura, Ibaraki-ken; Yoshiyuki Nakano, Hitachi, all of Japan

[73] Assignee: Hitachi, Ltd., Tokyo, Japan

[22] Filed: Apr. 6, 1973

[21] Appl. No.: 348,501

[30] Foreign Application Priority Data

Apr. 7, 1972 Japan .................... 47-25615
Dec. 13, 1972 Japan .................... 47-124379

[52] U.S. Cl. .................... 235/193, 235/183, 328/127
[51] Int. Cl. .................... G06g 7/18
[58] Field of Search .................... 235/184, 183, 193; 318/609, 610, 621, 622; 330/75; 328/127

[56] References Cited

UNITED STATES PATENTS

| | | | |
|---|---|---|---|
| 3,543,049 | 11/1970 | Farnsworth | 328/127 X |
| 3,614,633 | 10/1971 | Yalyshen et al. | 328/127 |
| 3,633,004 | 1/1972 | James et al. | 235/183 X |
| 3,731,232 | 5/1973 | Hekimian | 328/127 X |
| 3,741,474 | 6/1973 | Kawada et al. | 318/621 UX |

*Primary Examiner*—Joseph F. Ruggiero
*Attorney, Agent, or Firm*—Craig & Antonelli

[57] ABSTRACT

An electronic analog operational circuit having a large time constant such as several tens of minutes suitable for control elements in general industrial instrumentation, for example, a controller for a heat or nuclear power plant, in which as the feedback capacitor is employed a polarized capacitor of a small size and yet having a large capacity to which the output voltage of the operational amplifier and a predetermined bias voltage are applied additively.

26 Claims, 9 Drawing Figures

PATENTED NOV 12 1974 3,848,117

SHEET 5 OF 5

ELECTRONIC ANALOG OPERATIONAL CIRCUIT

The present invention relates to an electronic analog operational circuit for instrumentation or control, and more particularly to an electronic analog operational circuit having a large time constant in which a feedback capacitor is provided in the feedback circuit of the operational amplifier thereof.

Recently, an electronic analog operational circuit having a large time constant has been required for instrumentation and control. This is used in a control system for regulating an object to be controlled having a large inertia such as a boiler in a heat power plant, for example, in an automatic boiler control, automatic load regulator, automatic speed regulator or the like. The time constant required for these control systems is 10 and several minutes. An attempt to realize such a large time constant with an electronic analog operational circuit poses many problems.

This fact will next be explained in connection with an integrating circuit as an example, which is a principal element of an operational circuit having a capacitor in its feedback circuit. As is well known, the integrating time constant T is the product of the input resistance $R_i$ and the feedback capacity $C_f$, i.e., $T = R_i \cdot C_f$. Consequently, in order to prolong the time constant T, it is only sufficient to increase the resistance $R_i$ and/or the capacity $C_f$. For example, if the time constant T is to be set at 10 minutes, a high resistance of 40 MΩ is required when the capacity $C_f$ is 15 μF, and a high value 600 μF is required for the capacity $C_f$ when the resistance $R_i$ is 1 MΩ. The methods of increasing the resistance $R_i$ and increasing the capacity $C_f$ have the following disadvantages. If the resistance $R_i$ is high, the value of resistance varies depending on the variation in the ambient meteorological condition at the installation site, causing variation in the time constant which must have a fixed value. For this reason the resistance $R_i$ must be compensated for its variations due to the meteorological condition. Further, if the resistance $R_i$ is high, the input signal is weak, so that an expensive operational amplifier having a very good input characteristic must be employed.

On the other hand, if the feedback capacity is high, a large space is necessary therefor because a small size capacitor having a large capacity cannot be produced. Since the analog operation is of bipolar nature, generally a non-polarized capacitor such as a metallized paper capacitor is employed therefor. However, since the volume of these non-polarized capacitors becomes larger as their capacity becomes larger, they are undesirable for recently developed apparatus which have a tendency to miniaturization. Polarized capacitors such as tantalum electrolytic capacitors are of small size and yet have a large capacity. However, these capacitors cannot be used for bipolar analog operations unless they are non-polarized by some means. An example of the expedients for non-polarizing polarized capacitors to use them in analog operations is a bipolar or back-to-back connection of two polarized capacitors. However, the polarized capacitor can hardly withstand the reverse voltage and at the same time it has a characteristic similar to that of a diode in the reverse voltage region. For this reason, the composite capacity of the bipolar connection of capacitors, one of which is necessarily in the reverse voltage region, varies transiently when the polarity of the output voltage of an integrating circuit changes. This variation is large particularly when the integrating operation starts with a positive or negative input after both input and output of the integrating circuit remained "zero" for a long time. Consequently, there is the problem that the time constant of the integrating circuit becomes non-linear at that time.

Description is made in the above of the time constant of an integrating circuit as an example of an analog operational circuit having a feedback capacitor, there is however the problem in providing a large time constant by increasing either the resistance $R_i$ or the capacity $C_f$. This is not peculiar to integrating circuits but common also other operational circuits having feedback capacitors such as a first order lag circuit, proportional and integrating circuit, etc. Thus, the term "time constant" used in this specification refers not only to that of the integrating circuit, but also to those of the first order lag circuit, proportional and integrating circuit, etc.

It is unnecessary to say that if the time constant of an analog operational circuit having a large time constant can be set variably, it has wider applications than a conventional analog operational circuit having a small time constant. The conventional analog operational circuit had disadvantages in the following points: (1) The gain and the time constant of a circuit cannot be set independently of each other, but affect each other; (2) Even if the gain and the time constant can be set independently of each other, the accuracy of the time constant or gain is reduced when the voltage dividing ratio of the voltage divider provided to the operational circuit is reduced or in similar cases.

Therefore, an object of the present invention is to provide an electronic analog operational circuit having a large time constant.

Another object of the present invention is to provide an electronic analog operational circuit in which the time constant can variably be set and in which the time constant and the gain can be set independently of each other.

The above objects can be achieved by employing as the feedback capacitor of the analog operational circuit a polarized capacitor to which the output voltage of the operational amplifier and a predetermined bias voltage are additively applied to equalize the polarized capacitor with a non-polarized capacitor.

Thus, according to the present invention there is provided an electronic analog operational circuit comprising an input circuit for receiving a signal voltage, a first operational amplifier having a substantially infinite gain to which a signal voltage is supplied through the input circuit, and a feedback impedance circuit having at least a feedback capacitor provided between the input and output of the first operational amplifier for feeding the output signal of the first operational amplifier back to its input, in which the feedback capacitor is a polarized capacitor and the output of the first operational amplifier is fed with a predetermined bias voltage additively back to the first operational amplifier through the feedback capacitor.

The present invention will next be described in more detail by way of a few preferred embodiments with reference to the accompanying drawings, in which.

Figure 1:
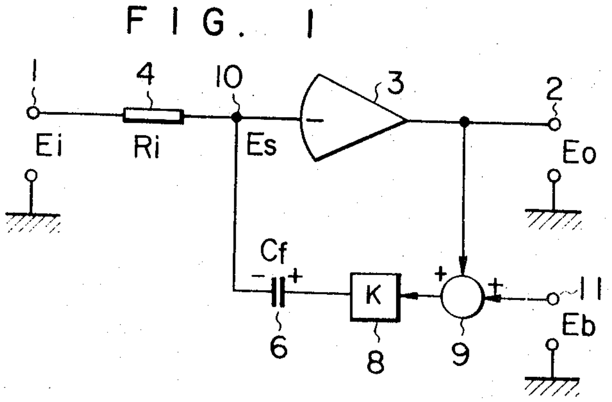
FIG. 1 is a block diagram of an integrating circuit as an example of an analog operational circuit having a feedback capacitor for explaining the principle of the present invention.

The present invention will now be described first with reference to FIG. 1 which is a fundamental circuit diagram of the integrating circuit which is a principal element of an analog operational circuit having a feedback capacitor. A polarized capacitor 6 is connected between the input 10 and the output 2 of an operational amplifier 3. An input resistor 4 is connected between the input 1 of the integrating circuit and the input 10 of the operational amplifier 3. The time constant of the integrating circuit is determined by the product $R_i \cdot C_f$ of the resistance $R_i$ of the input resistor 4 and the capacity $C_f$ of the capacitor $C_f$. A bias voltage $E_b$ is supplied to a terminal 11. A feedback level setter 8 divides the output voltage of a summing circuit 9 at a predetermined ratio $k$ ($0 < k < 1$). The sign " − " in the operational amplifier 3 designates the fact that the input thereto is of the opposite polarity to the output thereof. Among the voltage $E_i$ at the input terminal 1, the voltage $E_o$ at the output terminal 2, the voltage $E_b$ at the bias terminal 11, the compensating voltage $E_{co}$ for rendering the polarized capacitor 6 non-polarized, and the voltage $E_s$ at the point 10 there is the following relation:

$$E_i - E_s/R_i + (E_o + E_b)K - E_{co} - E_s/(1/C_f S) = 0 \quad (1)$$

where S is a Laplace operator. If the gain of the open loop is assumed to be infinite, $E_s \approx 0$. Then, the following relation results from Equation (1)

$$E_o = - 1/K \cdot R_i \cdot C_f S\ E_i - E_b + E_{co}/K \quad (2)$$

When the compensating voltage $E_{co}$ has the relation $$E_{co} = KE_b \quad (3)$$

with the bias voltage $E_b$ and the voltage dividing ratio K, Equation (2) results in the integral form $$E_o = - 1/K \cdot R_i \cdot C_f S\ E_i \quad (4)$$

From Equation (4) the time constant T is represented as $$T = K \cdot R_i \cdot C_f \quad (5)$$

The charging voltage $E_c$ of the capacitor 6 is, as is evident also from FIG. 1, $$E_c = k(E_o + E_b) \quad (6)$$

At this time the charging voltage $E_c$ is, for example, only within a range of 0 to 10 volts because the capacitor 6 is a polarized one. Consequently, it is sufficient to determine the bias voltage $E_b$ and the gain $k$ such that they satisfy the full range of the output voltage $E_o$. For example, if the arrangement is to be used at the range of the output voltage $E_o$ from −10 to +10 volts, the bias voltage $E_b$ and the gain $k$ can be selected as follows:

$$k(-10 + E_b) = 0 \quad (7)$$

$$k(+10 + E_b) = 10 \quad (8)$$

From Equations (7) and (8) it follows that $$E_b = 10(\text{volts}) \text{ and } k = 0.5$$

Then, the compensating voltage $E_{co}$ of the capacitor 6 is 5 volts as results from Equation (3). Consequently, when the output voltage $E_o$ varies in the range −10 to +10 volts, the charging voltage $E_c$ varies at a range of 0 to 10 volts taking the compensating voltage $E_{co}$ as the center and it never enters the negative region. Since the feedback level setting gain $k$ is 0.5, the polarized capacitor 6 is used apparently as having a half capacity. However, since the capacity of a polarized capacitor is sufficiently larger than a non-polarized one, there is no practical disadvantage even if the polarized capacitor is used at a half of its capacity.

Figure 2:
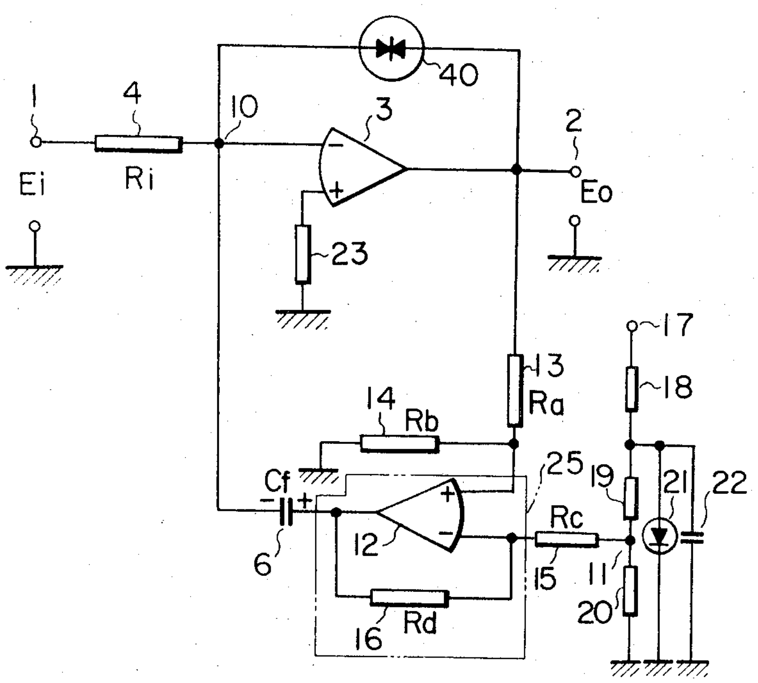
FIG. 2 is a circuit diagram of an embodiment of the present invention which is a more detailed materialization of the integrating circuit of FIG. 1.

FIG. 2 is a materialized circuit diagram of the integrating circuit of FIG. 1. The feedback level setter 8 and the summing circuit 9 in FIG. 1 are replaced by an operational amplifier 12, and operational resistors 13 and 14, 15 and 16 in FIG. 2. The terminal of the operational amplifier 12 designated by the sign " + " indicates that the input and output thereof are of the same polarity. In order to reduce the variation in and stabilize the bias voltage $E_b$ for rendering the polarized capacitor 6 non-polarized, the bias voltage is made into a constant voltage by a voltage regulator circuit consisting of resistors 18, 19 and 20, a Zener diode 21, and a noise absorbing capacitor 22. The feedback level setting gain $k_2$ and the time constant T of the integrating circuit of FIG. 2 are derived from $$E_c = -k_1 E_b + k_2 E_o = - R_d/R_c E_b + \{(1 + R_d/R_c)/(1 + R_a/R_b)\}\ E_o \quad (9)$$

as $$k_2 = (1 + R_d/R_c)/(1 + R_a/R_b) \quad (10)$$

$$T = \{(1 + R_d/R_c)/(1 R_a/R_b)\}\ R_i \cdot C_f \quad (11)$$

where $k_1$ is the gain of the bias voltage and $R_a$, $R_b$, $R_c$ and $R_d$ are resistances of the resistors 13, 14, 15 and 16, respectively. The feedback level setting gain $k_2$ is one similar to $k$ in the circuit of FIG. 1. When the gains are selected such that $k_1 = k_2 = k$ stands, the circuit of FIG. 2 can be represented as that of FIG. 1 in a block form. According to the circuit of FIG. 2, $k_1$ and $k_2$ can generally be selected separately. For example, if the resistances of the resistors 13 to 16 are selected such that $k_1 = ½$ and $k_2 = ⅓$ stand when the output voltage $E_o$ is from −10 to 10 volts, the charging voltage $E_c$ of the capacitor 6 is determined from Equation (9) to be from $$E_c = -\tfrac{1}{2} E_b + \tfrac{1}{3} \times 10 \quad (12)$$

to $$E_c = -\tfrac{1}{2} E_b + \tfrac{1}{3} \times (-10) \quad (13)$$

Therefore, if the bias voltage $E_b$ is selected to be −10 volts, the charging voltage $E_c$ of the polarized capacitor 6 can vary only at a range of from 5 − 10/3 volts to 5 + 10/3 volts when the output voltage $E_o$ varies at the range of from 10 volts to −10 volts, and hence the capacitor 6 is never used in the region of negative polarity.

Generally, the integrating circuit is provided with a limiter circuit 40 for protecting the circuit from an abnormal signal between the input terminal 10 and the output terminal 2. This is to prevent the operational circuit from breakdown or damage when the output voltage $E_o$ exceeds the predetermined range of from −10 to 10 volts. The limiter voltage $E_L$ is set, for example, at 15 and −15 volts. Then, even if the output voltage $E_o$ reaches −15 volts in the above-described example, the charging voltage $E_c$ remains at 0 volt, so that the polarized capacitor 6 is prevented from being subjected to a negative voltage and damage.

In FIG. 2, the circuit 25 consisting of the operational amplifier 12 and the feedback resistor 16 is generally a differential amplifier the input impedance of which is considered to be substantially infinite. As a result, the degree of burden of the capacitor 6 on the operational amplifier 3 can be reduced.

To the opposite sign input terminal of the operational amplifier 12 is applied a constant bias voltage $E_b$. This is, as has been described in detail, selected so that it satisfies Equations (12) and (13) in order to use the polarized capacitor 6 always at the positive polarity for the output voltage $E_o$ which varies in positive and negative polaraties.

Figure 3:
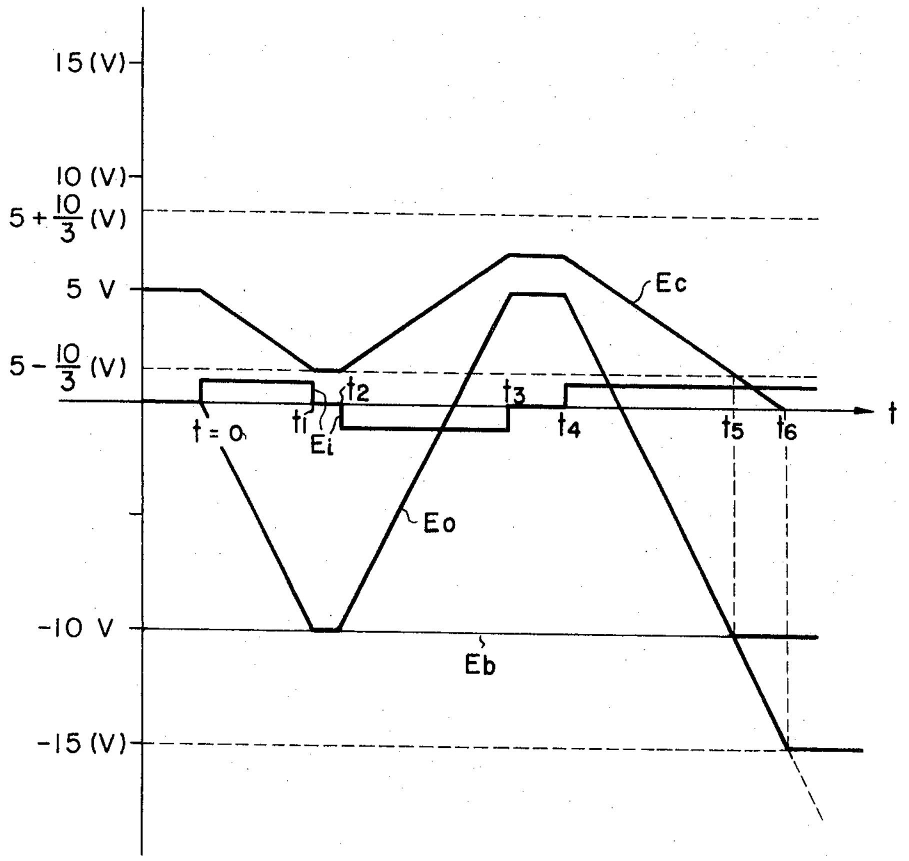
FIG. 3 is an operation waveform of the integrating circuit of FIG. 2.

FIG. 3 shows the operational waveforms of the integrating circuit of FIG. 2, in which the values of the voltages and the coefficients are those explained referring to Equations (12) and (13). According to FIG. 3, the charging voltage $E_c$ is 5 volts when both the input and output voltages $E_i$ and $E_o$ are zero. This is evident from Equation (9) also. When the input voltage $E_i$ is at the positive level, the operational amplifier 3 is in the opposite sign operation, and hence the output voltage $E_o$ decreases in the negative direction in accordance with the time constant represented by Equation (11). At this time the charging voltage $E_c$ also decreases. Then, the input voltage $E_i$ returns to zero at a time $t_1$, at which time if it is assumed that the output voltage $E_o$ is −10 volts, the charging voltage $E_c$ is 5 − 10/3 volts. During the time (from $t_1$ to $t_2$) that the input voltage $E_i$ remains zero the integrating operation is interrupted to enter a holding state and both the charging and output voltages $E_c$ and $E_o$ hold their values at the time $t_1$. Next, if the input voltage $E_i$ changes to a negative value at the time $t_2$ and maintains this value to a time $t_3$, the output voltage $E_o$ increases in the positive direction in accordance with the integrating time constant T of Equation (11), and at the same time the charging voltage $E_c$ also increases.

Then, if it is assumed that the input voltage $E_i$ changes again to a positive value at a time $t_4$ and this value is maintained, both the output voltage $E_o$ and the charging voltage $E_c$ decrease in the negative direction and the output voltage $E_o$ reaches its lower limit value −10 volts at a time $t_5$. However, as has been described, since the charging voltage $E_c$ is 5 −10/3 volts at the time $t_5$, no problem occurs. At a time $t_6$ the output voltage $E_o$ becomes −15 volts. However, since the gains $k_1$ and $k_2$ and the bias voltage $E_b$ are selected to be ½, ⅓, and −10 volts, respectively, in FIG. 3, the charging voltage $E_c$ of the polarized capacitor 6 only becomes 0 volt and never becomes negative. At this time, if the operational amplifier 3 or 12 is not saturated, the output voltage $E_o$ becomes more negative and also the charging voltage $E_c$ becomes negative with the further lapse of time. However, since the operational amplifier 3 is provided with the limiter circuit 40 so that the output voltage $E_o$ does not exceed −15 volts, a negative voltage is never applied to the polarized capacitor 6.

As has been described above, according to the present invention, an analog integrating circuit having a large time constant and a high reliability can be provided without employing a resistor having a high resistance by employing a polarized capacitor as the feedback capacitor only in the positive voltage region. The analog integrating circuit of FIG. 2 has the following advantages:

1. Since it does not employ a resistor having a high resistance, it is immune to the variation in the ambient meteorological conditions, in particular humidity, providing sufficiently stable characteristics.
2. Since a polarized capacitor of a small size and having a large capacity can be employed therein, it can easily have a large integrating time constant and is advantageous in packing into a small mounting area such as a printed circuit board.
3. An operation of both positive and negative polarities is possible with an integrating circuit employing a polarized capacitor as the feedback capacitor.
4. Since a differential amplifier is employed as the summing circuit, only the signal is fed back to the input of the operational amplifier 3 to separate the burden on the input side and the output side.

Figure 4:
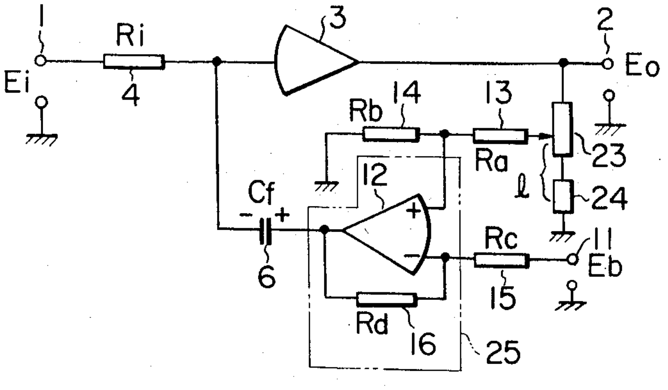
FIG. 4 is another embodiment of the present invention which is similar to the integrating circuit of FIG. 2 except that the time constant thereof is made variable.

FIG. 4 is a circuit diagram of an embodiment of the integrating circuit of FIG. 2 in which the time constant T is made variable. The resistors 23 and 24 function as a voltage divider connected to the output terminal of the integrating circuit. The protection resistor 24 is provided for preventing the feedback circuit from becoming an open loop when the voltage division ratio $l$ is 0. The output $E_o$ of the integrating circuit is subjected to a voltage division by the voltage dividers 23 and 24 the output of which is supplied to the polarized feedback capacitor 6 through the differential amplifier 25. Thus, the electrostatic capacity $C_f$ of the feedback capacitor 6 is equivalently made variable with the voltage division ratio $l$. Consequently, the time constant of the embodiment of FIG. 4 is that of Equation (11) multiplied by $l$.

Figure 5:
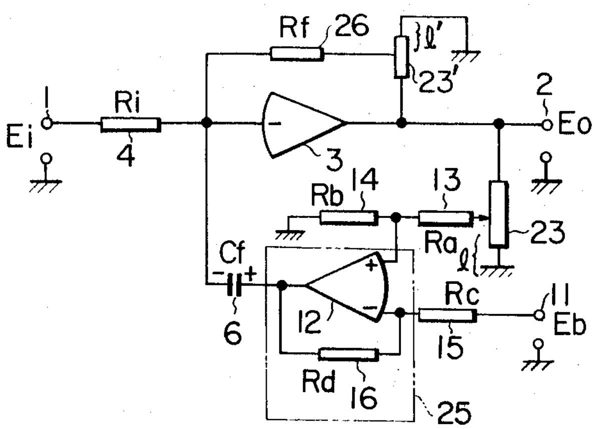
FIG. 5 is an embodiment of the first order lag circuit according to the present invention which has a large time constant.

FIG. 5 is a circuit diagram of the first order lag circuit according to the present invention provided with a resistor 26 and a voltage divider 23' as a second feedback loop. The gain of the first order lag circuit is the product $R_f/R_i \cdot l'$ of the ratio $R_f/R_i$ of the feedback resistance $R_f$ to the input resistance $R_i$ and the voltage division ratio $l'$, while the time constant T is represented as $T = l \cdot k_2 \cdot R_f \cdot C_f$ where $k_2$ is that represented by Equation (10) because in the first feedback loop the electrostatic capacity $C_f$ of the feedback capacitor 6 is equivalently made variable by means of the voltage dividing resistor 23 and the differential amplifier 25. From this it can be seen that when the voltage division ratio $l$ of the voltage dividing resistor 23 is adjusted, only the time constant T is varied, but the gain is unaffected. Also, since the loading effect of the voltage dividing resistor 23 is substantially null due to the provision of the differential amplifier 25 having an infinite input resistance, the accuracy of setting the voltage division ratio $l$ is high and the first order lag time constant T can be set to a wide range. Further, since the signal source resistance of the polarized feedback capacitor 6 is low for a similar reason, a first order lag characteristic of high reliability can be provided.

Figure 6:
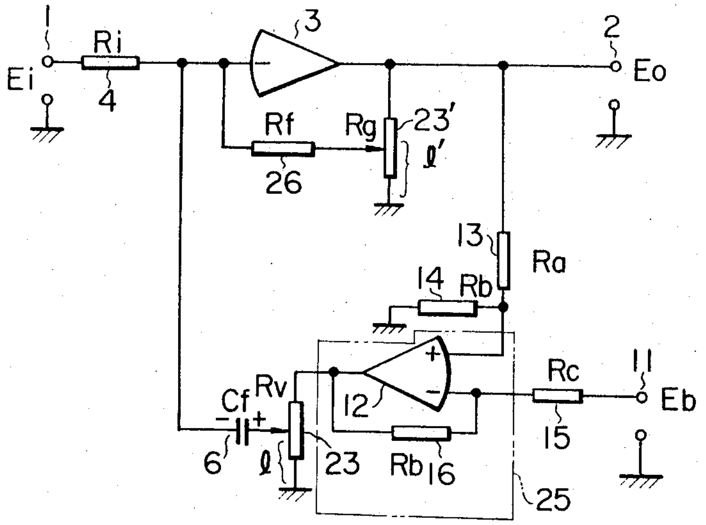
FIG. 6 is another embodiment of the analog operational circuit of the lead/lag type according to the present invention.

FIG. 6 is an embodiment of the analog operational circuit of the lead/lag type according to the present invention. The differential amplifier 25 and the resistors 13, 14 and 15 are for non-polarizing the polarized feedback capacitor 6. Consequently, in principle the circuit of FIG. 6 is equivalent to the combination of the input resistance $R_i$, a series circuit of the resistance $R_f$ and the resistance $R_g (1 - l')$ as a first feedback loop and a series circuit of the $R_v (1 - l)$ and the capcity $C_f$ as a second feedback loop. The relation between the input and output of this circuit is $$E_o/E_i = 1/R_i \times 1+SC_f \times [R_g \cdot R_v(1-l)(1-l')+R_f \cdot R_v(1-l)/R_f + R_g (1 - l')]/1+SC_f\{R_f + R_g(1 - l') + R_v(1 - 1)\} = 1/R_i \times 1 + ST_2/1 + ST_1 \quad (14)$$

where $$T_1 = \{R_f + R_g(1 - l') + R_v(1 - l)\} \ C_f \quad (15)$$

$$T_2 = R_g \cdot R_v(1 - l)(1 - l') + R_f R_v(1 - l-)/R_f + R_g(1 - l') \times C_f \quad (16)$$

As is represented by Equation (14) also, the circuit of FIG. 6 is a circuit of the lead/lag type (a composite circuit of the first order lag circuit $1/1 + ST_1$ and the first order lead circuit $1 + ST_2$). In this case also, since the polarized capacitor 6 can be used as a non-polarized capacitor and since the capacitor 6 is of a small size and has a large capacity, the lag time constant $T_1$ and the lead time constant $T_2$ are sufficiently large. Also it occupies only a small area for packaging on a switch board or the like.

Figure 7:
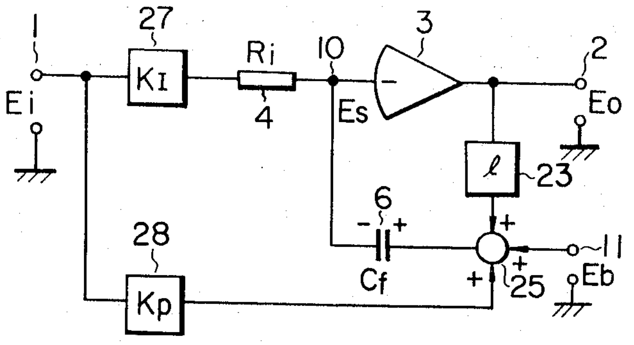
FIG. 7 is a block diagram of a proportional and integral circuit according to the present invention having a large time constant.

A description will finally be made of a proportional and integral circuit as an electronic analog operational circuit having a feedback capacitor. FIG. 7 is a block diagram of the principle of the proportional and integral circuit. If the bias voltage is expressed by $E_b$, the charging voltage $E_c$ of the polarized capacitor 6 is $$E_c = E_b + k_p \cdot E_i + l \cdot E_o > 0 \quad (17)$$

where $k_p$ is the gain of a proportional scale-factor element 28, and $l$ is the gain of a scale-factor element 23. The relation between the input and the output is expressed as follows:

$$k_I \cdot E_i - E_s/R_i + E_c - E_{co} - E_s / 1/C_f S = 0 \quad (18)$$

where $k_I$ is the gain of an integral scale-factor element 27 and $E_{co}$ is a compensating voltage for non-polarizing the polarized capacitor 6. If the open gain of the operational amplifier 3 is regarded as infinite, $E_s = 0$. Then the output voltage $E_o$ is from Equations (17) and (18)

$$E_o = - 1/l(k_p \cdot E_i + k_I/R_f C_f S)\ E_i - (E_b - E_{co})/l \quad (19)$$

If $E_{co} = E_b$, Equation (19) becomes $$E_o = - 1/l(k_p \cdot E_i + k_I/R_i \cdot C_f S) \quad (20)$$

Thus, the proportional gain is $k_p/l$ and the integrating time constant is $l \cdot R_i \cdot C_f/k_I$. Consequently, similarly to the circuit of FIG. 2, the voltage applied to the feedback capacitor 6 is never of negative polarity if the arrangement is used within a definite range of the output voltage $E_o$. Therefore, since a polarized capacitor of a large capacity can be used as the feedback capacitor 6, a large time constant can be realized without employing a high resistance. As a result, a damp-proof and stable proportional and integral circuit can be provided.

Figure 8:
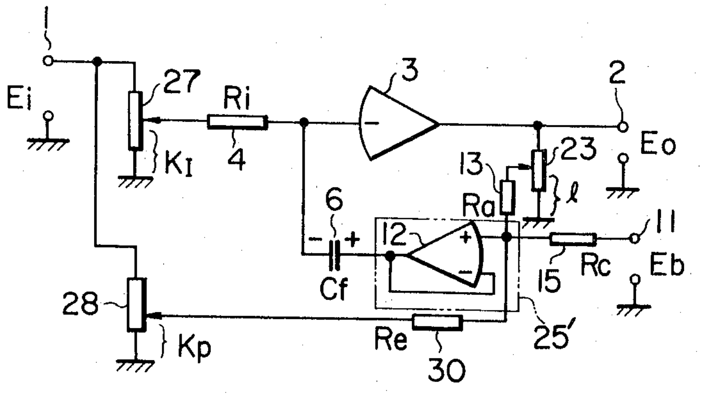
FIG. 8 is a more detailed and materialized circuit diagram of the proportional and integral circuit of FIG. 7.

FIG. 8 is a materialized circuit diagram of the circuit of FIG. 7. The relation between the input and the output is $$E_o = - E_i/R_e \cdot R_c \cdot l\{R_a \cdot R_c \cdot k_p + (R_e \cdot R_a + R_a \cdot R_c + R_c \cdot R_e) k_I/R_i \cdot C_f S\} + R_e \cdot R_a \cdot E_b/R_e \cdot R_a + R_a \cdot R_c + R_c \cdot R_e - E_{co} \quad (21)$$

Here, if the compensating voltage $E_{co}$ is selected to be $$E_{co} = R_a \cdot R_e/R_e \cdot R_a + R_a \cdot R_c + R_c \cdot R_e\ E_b$$

the output voltage $E_o$ can be obtained as a proportional plus integral form as follows:

$$E_o = -1/R_e{\cdot}R_c{\cdot}l\ \{R_a{\cdot}R_c{\cdot}k_p + (R_e{\cdot}R_a + R_e{\cdot}R_c + R_c{\cdot}R_a)\ k_I/R_i{\cdot}C_f S\}\ E_i \quad (22)$$

Thus, the proportional gain is $R_a{\cdot}R_c{\cdot}k_p/R_e{\cdot}R_c{\cdot}l$ and the integrating constant is $R_e{\cdot}R_c{\cdot}l{\cdot}R_i{\cdot}C_f/k_I(R_e{\cdot}R_a+R_e{\cdot}R_c+R_c{\cdot}R_a)$.

As has been described in detail referring to FIGS. 7 and 8, in the proportional and integral circuit according to the present invention the integral time constant and the proportional gain can be set independently of each other by adjusting the gains $k_I$ and $k_p$ separately. Conversely, it is possible to simultaneously vary the integral time constant and the proportional gain with a reverse tendency and with the same degree of ratio by adjusting the gain $l$ of the scale-factor element 23. Further, according to the embodiment of FIG. 8 a large time constant can be provided by employing a polarized capacitor 6 having a large electrostatic capacity. At this time, since only a resistor having a low resistance is sufficient for the input resistor 4, no such a problem as variation in the resistance against moisture occurs. Consequently, a large time constant stable against moisture can be provided.

When it is desired to make the proportional gain very high, it is only sufficient to make the gain $k_p$ apparently high to insert an amplifier between the voltage divider 28 and the resistor 30. Further, if the summing circuit 25' is formed in a voltage follower, the proportional and integral circuit does not become a burden when it is seen from the input circuit connected to the input terminal 1 because the input impedance of the voltage follower is considered to be infinite.

Figure 9:
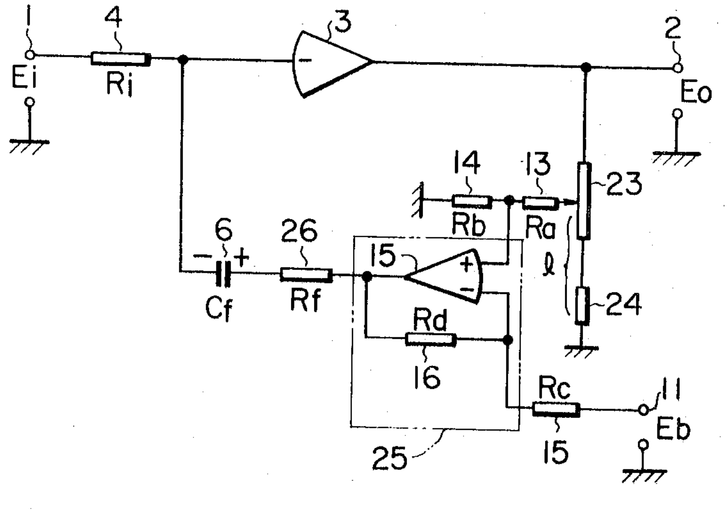
FIG. 9 is another embodiment of the proportional and integral circuit according to the present invention.

The circuit of FIG. 9 is another proportional and integral circuit of the type consisting of a series connection of an input resistor and a feedback resistor, and a feedback capacitor as is generally known. As is easily understood from the above description made referring to FIGS. 1 to 8, also the proportional and integral circuit of FIG. 9 can provide a large and adjustable time constant. The circuit of FIG. 9 is one which employs a differential amplifier as the summing circuit 25.

What we claim is:

1. An electronic analog operational circuit comprising an input circuit for receiving a signal voltage, a first operational amplifier having a substantially infinite gain to which a signal voltage is supplied through the input circuit, means for summing the output voltage of the first operational amplifier and the output voltage of a bias means, and a feedback circuit having at least a polarized capacitor for feeding the output voltage of the summing means back to the input terminal of the first operational amplifier, in which the bias means includes means for generating a predetermined voltage such that the polarity of the voltage applied across the polarized capacitor is in accordance with that of the capacitor over the entire range of the output of the first operational amplifier.

2. An electronic analog operational circuit according to claim 1, the summing means is composed of a second operational amplifier having an output terminal and opposite and same polarity input terminals and a resistor connected between the opposite polarity input terminal and the output terminal of the second operational amplifier, the opposite polarity input terminal of the second operational amplifier receiving the bias voltage through an input resistor, and a first resistor and a second resistor series connected between the output terminal of the first operational amplifier and the ground, the same polarity input terminal of the second operational amplifier being connected to a connection point of the first resistor and the second resistor.

3. An electronic analog operational circuit according to claim 2, comprising a variable resistor connected between the output terminal of the first operational amplifier and the ground, the end of the series connection of the first resistor and the second resistor remote from the ground being connected to the output terminal of the first operational amplifier through the output terminal of the variable resistor.

4. An electronic analog operational circuit according to claim 1, in which the input circuit includes a resistor.

5. An electronic analog operational circuit according to claim 2, in which the input circuit includes a resistor.

6. An electronic analog operational circuit according to claim 3, in which the input circuit includes a resistor.

7. An electronic analog operational circuit according to claim 4, in which the feedback impedance circuit comprises the polarized capacitor and a feedback resistor.

8. An electronic analog operational circuit according to claim 2, in which the input circuit comprises a resistor and the feedback impedance circuit comprises the polarized capacitor and a feedback resistor.

9. An electronic analog operational circuit according to claim 3, in which the input circuit comprises a resistor and the feedback impedance circuit comprises the polarized capacitor and a feedback resistor.

10. An electronic analog operational circuit according to claim 7, comprising a variable resistor connected between the output terminal of the summing means and the ground, one end of the polarized capacitor being connected to the output terminal of the variable resistor.

11. An electronic analog operational circuit according to claim 8, comprising a variable resistor connected between the output terminal of the second operational amplifier and the ground, one end of the polarized capacitor being connected to the output terminal of the variable resistor.

12. An electronic analog operational circuit according to claim 1, comprising a variable resistor connected between the output terminal of the first operational amplifier and the ground and a resistor connected between the output terminal of the variable resistor and the input of the first operational amplifier.

13. An electronic analog operational circuit according to claim 2, comprising a variable resistor connected between the output terminal of the first operational amplifier and the ground, and a resistor connected between the output terminal of the variable resistor and the input of the first operational amplifier.

14. An electronic analog operational circuit according to claim 3, comprising another variable resistor connected between the output terminal of the first operational amplifier and the ground, and a resistor connected between the output terminal of the another variable resistor and the input of the first operational amplifier.

15. An electronic analog operational circuit according to claim 10, comprising another variable resistor connected between the output terminal of the first operational amplifier and the ground, and a resistor connected between the output terminal of the another variable resistor and the input of the first operational amplifier.

16. An electronic analog operational circuit according to claim 11, comprising another variable resistor connected between the output terminal of the first operational amplifier and the ground, and a resistor connected between the output terminal of the another variable resistor and the input of the first operational amplifier.

17. An electronic analog operational circuit according to claim 4, in which the feedback impedance circuit further comprises a feedback resistor series connected with the polarized capacitor.

18. An electronic analog operational circuit according to claim 5, in which the feedback impedance circuit further comprises a feedback resistor series connected with the polarized capacitor.

19. An electronic analog operational circuit according to claim 6, in which the feedback impedance circuit further comprises a feedback resistor series connected with the polarized capacitor.

20. An electronic analog operational circuit according to claim 4, comprising first and second scale-factor elements for multiplying the input voltage by a predetermined coefficient, the input side of the input resistor being connected to the output terminal of the first scale-factor element, the output voltage of the second scale-factor element being supplied to the polarized capacitor additively with the output of the first operational amplifier and a predetermined bias voltage.

21. An electronic analog operational circuit according to claim 20, comprising a variable resistor connected between the output terminal of the first operational amplifier and the ground, the output voltage of the first operational amplifier being supplied to the polarized capacitor through the output terminal of the variable resistor.

22. An electronic analog operational circuit according to claim 20, in which the means for summing sums the output voltage of the second scale-factor element, the bias voltage and the output voltage of the first operational amplifier, the summing means consisting of first, second and third resistors and a second operational amplifier having an output terminal and same and opposite polarity input terminals, the output terminal and the opposite polarity input terminal being short-circuited, the same polarity input terminal receiving the output voltage of the first operational amplifier through the first operational resistor, the bias voltage through the second resistor and the output voltage of the second scale-factor element through the third resistor.

23. An electronic analog operational circuit according to claim 21, in which the means for summing sums the output voltage of the second scale-factor element, the bias voltage and the output voltage of the first operational amplifier, the summing means consisting of first, second and third resistors and a second operational amplifier having an output terminal and same and opposite polarity input terminals, the output terminal and the opposite polarity input terminal being short-circuited, the same polarity input terminal receiving the output voltage of the first operational amplifier through the first operational resistor, the bias voltage through the second resistor and the output voltage of the second scale-factor element through the third resistor.

24. An electronic analog operational circuit according to claim 2, in which the gain for an output signal and the gain for a bias voltage are different from each other.

25. An electronic analog operational circuit according to claim 20, comprising a limiter connected between the input and the output of the first operational amplifier, the limiter voltage being higher than the ordinary usage voltage but lower than the voltage which render the polarized capacitor of negative polarity.

26. An electronic analog operational circuit according to claim 1, in which the summing means includes a second operational amplifier having its opposite polarity input terminal short-circuited to its output terminal and having its same polarity input terminal supplied with a bias voltage and the output of the first operational amplifier through separate input resistors.

* * * * *